US007024481B2

(12) United States Patent
Kaniyar et al.

(10) Patent No.: US 7,024,481 B2
(45) Date of Patent: Apr. 4, 2006

(54) METHOD AND FRAMEWORK FOR PROCESSING NETWORK COMMUNICATION PROTOCOL TIMERS

(75) Inventors: Sanjay N. Kaniyar, Redmond, WA (US); Nk Srinivas, Sammamish, WA (US); Abolade Gbadegesin, Seattle, WA (US); Shaun D. Cox, North Bend, WA (US); Bhupinder S. Sethi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 09/999,132

(22) Filed: Nov. 1, 2001

(65) Prior Publication Data

US 2003/0084175 A1    May 1, 2003

(51) Int. Cl.
*G06F 15/16* (2006.01)
(52) U.S. Cl. .................. 709/227; 709/248; 713/502
(58) Field of Classification Search ................ 709/227, 709/248; 370/395.52; 719/313, 314, 318; 713/500–502; 711/108; 714/55
See application file for complete search history.

(56) References Cited

U.S. PATENT DOCUMENTS

| | | | | |
|---|---|---|---|---|
| 5,838,957 A | * | 11/1998 | Rajaraman et al. | 713/502 |
| 5,978,849 A | * | 11/1999 | Khanna | 709/227 |
| 6,035,418 A | * | 3/2000 | Recio et al. | 714/18 |
| 6,052,737 A | * | 4/2000 | Bitton et al. | 709/248 |
| 6,427,161 B1 | | 7/2002 | LiVecchi | |
| 6,446,225 B1 | * | 9/2002 | Robsman et al. | 714/55 |
| 6,629,195 B1 | * | 9/2003 | Schroeder et al. | 711/108 |
| 6,718,479 B1 | * | 4/2004 | Christenson | 713/502 |

OTHER PUBLICATIONS

Varghese, George, et al., "Hashed and Hierarchical Timing Wheels: Efficient Data Structures for Implementing a Timer Facility", *IEEE Transactions on Networking*, Dec. 1997, pp. 1-24.

* cited by examiner

*Primary Examiner*—Jeffrey Pwu
(74) *Attorney, Agent, or Firm*—Wolf, Greenfield & Sacks, P.C.

(57) ABSTRACT

A new communications connection timer management framework for handling network communications protocol timers is disclosed. The timer management framework separates transmission control blocks (TCBs) having scheduled actions from the set of all TCBs maintained by a server. The TCBs having scheduled actions are referenced by a time-space partitioned data structure having time-slots corresponding to a current protocol timer "tick" value. The active TCBs are placed within particular ones of the time-space partitions based upon their expiration times. During each timer check sequence (e.g., once every 100 millisecond timer tick for TCP protocol timers), the timer management framework accesses a partition associated with a current timer value and checks the TCBs referenced within the current partition.

33 Claims, 5 Drawing Sheets

METHOD AND FRAMEWORK FOR PROCESSING NETWORK COMMUNICATION PROTOCOL TIMERS

AREA OF THE INVENTION

The present invention generally relates to the area of computer networks and implementation of communication protocols within such networks. More particularly, the present invention is directed to management of timers associated with computer network communications protocols (e.g., Transmission Control Protocol).

BACKGROUND OF THE INVENTION

The Internet has experienced explosive growth over the past decade. While a significant portion of the sites on the Internet are only visited rather infrequently, a number of sites and their associated services are called upon to support hundreds of thousands of simultaneous connections. In some instances, the processing load is such that the workload generated by active requests must be distributed to a large number of servers to avoid excessive delays. Information sites/portals are examples of such sites.

However, other sites/web-based services, due to the nature of their services, can support the hundreds of thousands of simultaneous connections using a single server node. Examples of such services are web-based email and instant messaging. Because users are typically connected to the server in a mode where no action needs to be taken by the server, the server is able to handle most user loads without substantial degradation of service even when a very large number of open connections are being serviced. In such instances, however, maintaining the connections, and in particular their associated Transmission Control Protocol (TCP) timers, can impose a significant load on the server's processor(s).

The well-known (and documented) Transmission Control Protocol supports a number of scheduled event timers for each connection. These timers include, among others: (1) retransmission, (2) Delay-Acknowledgement, (3) Push, (4) Silly-Window-Syndrome prevention, (5) Finish-Wait-2-State, and (6) Connection establishment/disconnection. In a system incorporating TCP to maintain and support connections over, for example, the Internet, the TCP timers are maintained in a transmission control block (TCB).

During the lifetime of a TCP connection, a number of events are scheduled on the connection to occur after a specified period of time. For example, the protocol may not indicate "data received" from the network immediately to a user. Instead it waits for a period of time (e.g., 500 msec.) to ensure that there is no more data to be received from the network. The protocol schedules an "indicate data" action on the connection to fire after the 500 msec. wait period expires.

In another example, if data is sent on a connection, a timer corresponding to a "retransmit" action is set and the protocol waits for a period of time for acknowledgement from the intended recipient. If such an acknowledgement is not received within the wait period, then the timer fires, and the data is retransmitted. The timer is cleared if the acknowledgement is received prior to expiration of the wait period.

To schedule such actions, the protocol sets an appropriate timer within the TCB. A timer management framework accesses the timers, notes when one has expired, and invokes a proper handler routine.

In a known TCP timer handling scheme, the protocol includes a timer handler procedure that is invoked once every timer tick (100 msec.). The timer handler walks through the set of all TCBs every 100 msec. searching for scheduled actions that have now become current. While such a task imposes a trivial load on a server supporting a thousand or so concurrent connections, servicing the timers can consume significant CPU resources when hundreds of thousands of connections are simultaneously supported.

SUMMARY OF THE INVENTION

The present invention comprises a new method and framework for processing network communication protocol timers that avoids scanning a large portion of the set of transmission timer structures (e.g., TCBs) during a periodically executed timer check sequence that searches for expired timers associated with supported network connections. More particularly, the present invention generates a time-space partitioned transmission control timer expiration event structure for active timers associated with network communication connections. An example of such timers are ones associated with TCP connections.

The present invention comprises a new efficient and highly scalable communications timer management framework for handling action scheduling timers used for management of network communications connections. An example of such timers are the set of timers associated with the Transmission Control Protocol. Such timers are stored within connection status structures (e.g., transmission control blocks) maintained for simultaneous network connections maintained by a server.

A connection timer management framework embodying the present invention includes an active connections timer data structure. This data structure includes a set of references to ones of the set of connection status structures. Such referenced ones of the set of connection status structures are added to the active connections timer data structure only if they include at least one scheduled action.

Adding a reference, within the active connections timer data structure, to a connection status structure is performed by a scheduled action handler that receives notification of a new action scheduled on a connection. Thereafter, the active handler adds a reference to a connection status structure in the active connections timer structure corresponding to the connection in response to determining that the connection status structure is not currently referenced on the active connections timer structure.

In particular embodiments of the invention, the scheduled action handler initially calculates and places an expiration time corresponding to a minimum delay (e.g., 200 milliseconds) in a connection status structure for a connection that has not previously had a scheduled event (i.e., this is a first scheduled event on the connection). Another particular enhancement associated with another embodiment of the present invention includes a lazy removal criteria wherein a reference is removed from the active connections timer data structure only if one of two possible events occurs. Either, an earlier expiration time is assigned to the connection status structure, or the expiration time equals the current time of the communication protocol timer.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF ILLUSTRATIVE EMBODIMENTS

An exemplary embodiment of a communications connection timer management framework seeks to reduce loading through particularized management of transmission control blocks (TCBs) based upon the whether the connection has a scheduled action. More particularly, the timer management framework maintains a separate reference structure for TCBs that have scheduled actions. The TCBs without scheduled actions are set aside and are not checked while searching for scheduled events. Thus, in network environments wherein a server maintains connections for a very large number of clients that are not actively transmitting or receiving data (i.e., there are no scheduled actions), checking only the TCBs that have scheduled actions reduces CPU loading associated with TCB checking and potentially improves server performance.

Filtering inactive TCBs may be insufficient by itself to avoid undue loading of TCB checks on a CPU. This is especially true when many scheduled actions are supported in TCBs, but are not scheduled to expire within a same slice of time. In such instances a timer management framework accesses during each timer check sequence TCBs that do not yet have expired timers. As a consequence the timer management framework accesses a TCB multiple times before the timer management framework is ultimately called upon (if at all) to perform some action in response to a timer expiration event (a timed event "fires").

Thus, to further reduce accessing active TCBs, an exemplary timer management framework embodying the present invention comprises a time-space partitioned TCB timer management structure for storing references to a set of active TCBs. As will be explained further herein below, in an embodiment of the present invention, the active TCBs are placed within particular ones of the time-space partitions corresponding to different time-slices. During each timer check sequence (e.g., once every 100 millisecond timer tick for TCP protocol timers), the timer management framework accesses a partition associated with a current time-slice and checks the TCBs referenced within the current partition. The framework also processes TCBs within a partition associated with a prior timer tick that were not processed during a previous timer tick.

The above-described timer management framework samples only a portion of the available time-space represented by TCBs having scheduled actions. Thus, there exists a potential to greatly reduce the fraction of TCBs accessed during a timer check sequence. This in turn enables server applications to support a very large number of simultaneous connections without TCB management unduly loading the server's CPU. A particular exemplary embodiment of the present invention and a number of enhancements to a basic timer management scheme are described herein below with reference to the figures.

Figure 1:
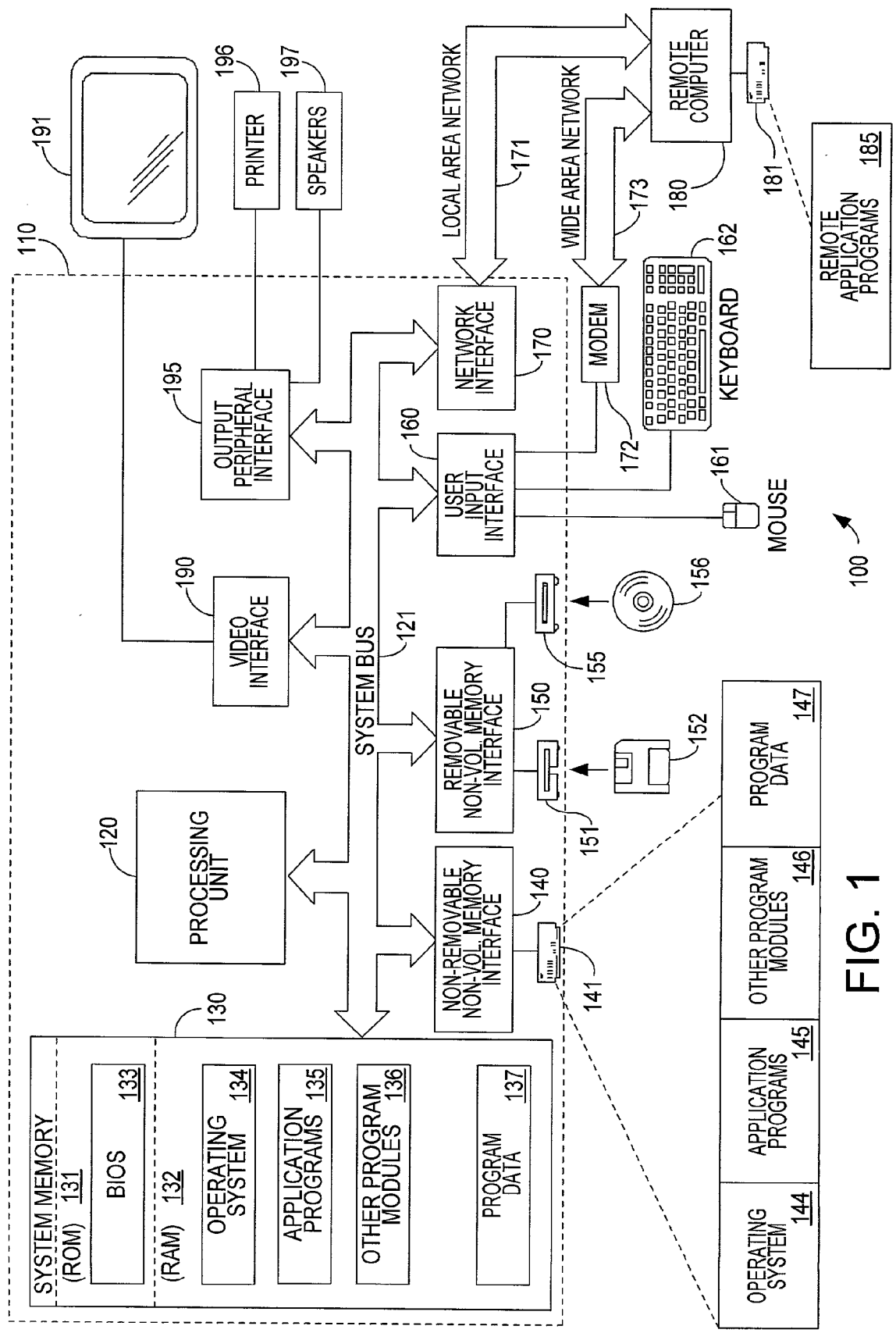
FIG. 1 is a schematic drawing illustratively depicting an exemplary computing environment for a machine carrying out an embodiment of the present invention.

In an embodiment of the present invention, a TCP timer management framework comprises server communication system software executed within a server computer operating environment such as the one depicted in FIG. 1, and in particular one that is configured to support potentially hundreds of thousands of concurrent network connections. Such a computing environment is potentially present in large email and instant messaging server configurations that exist today. FIG. 1 illustratively depicts an example of a suitable operating environment 100 within which the invention is implemented.

The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention is operational with numerous other general-purpose or special-purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. While a single processing unit 120 is depicted in the embodiment depicted in FIG. 1, as mentioned herein above, alternative embodiments of the invention include multiple processing units, and indeed, a specific embodiment of the invention contemplates a partitioned timer structure to increase capacity in such multiprocessor environments. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
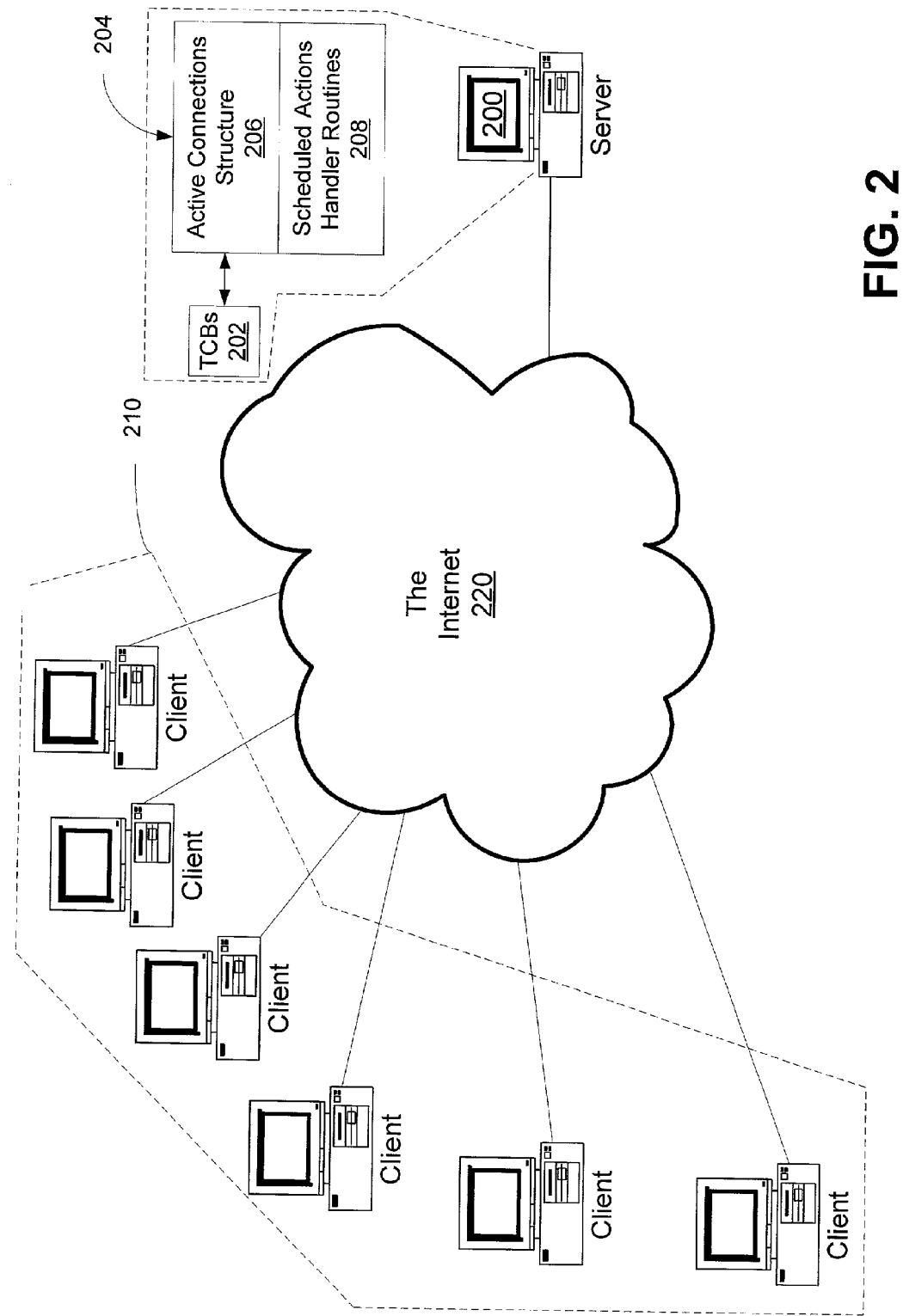
FIG. 2 is a schematic diagram depicting components of an exemplary application environment for implementing the present invention including a server supporting a massive number of connections to web-based clients.

Having described an exemplary computing environment for executing a connection timer management framework embodying the present invention, attention is directed to FIG. 2 that depicts an exemplary network application environment within which the present invention is practiced. In particular, the exemplary network environment includes a web-based email server 200 that provides access by clients 210 to email services via the Internet 220. While the Internet 220 is a most likely current network environment in which the email server 200 can utilize the benefit from the communications connection timer management framework of the present invention, the present invention can be utilized in other environments. Furthermore, while six clients 210 are depicted, they are intended to be representative of tens and evens hundreds of thousands of clients simultaneously connected to the email server 200.

The email server 200 embodying the present invention, implementing by way of example TCP, includes a set of transmission control blocks 202. The set of transmission control blocks 204 are referenced by a timer management framework 204 that includes an active connection timers structure 206 (see, FIG. 3 described herein below) as well as handling routines 208 (see, FIGS. 5 and 6) for maintaining the references within the active connection timers structure 206.

The present invention is particularly useful in applications, such as web-based email and instant messaging services, wherein a very large number of simultaneous client connections are supported by a single server, yet only a small fraction have pending requests that require consumption of the single server's CPU capacity. Such a case arises in the context of instant messaging and web-based email systems when users have open connections with the servers, but the users are typically not actively transmitting or receiving information. The known method of servicing TCP timers (i.e., checking all TCBs every 100 milliseconds) can potentially consume an undue portion of the computing power of the server when the number of connection is very large. The present invention seeks to reduce CPU loading by TCB-checking operations in environments such as the one depicted in FIG. 2 wherein a server simultaneously maintains a very large number of connections, but only a small fraction of the connections have scheduled actions.

Figure 3:
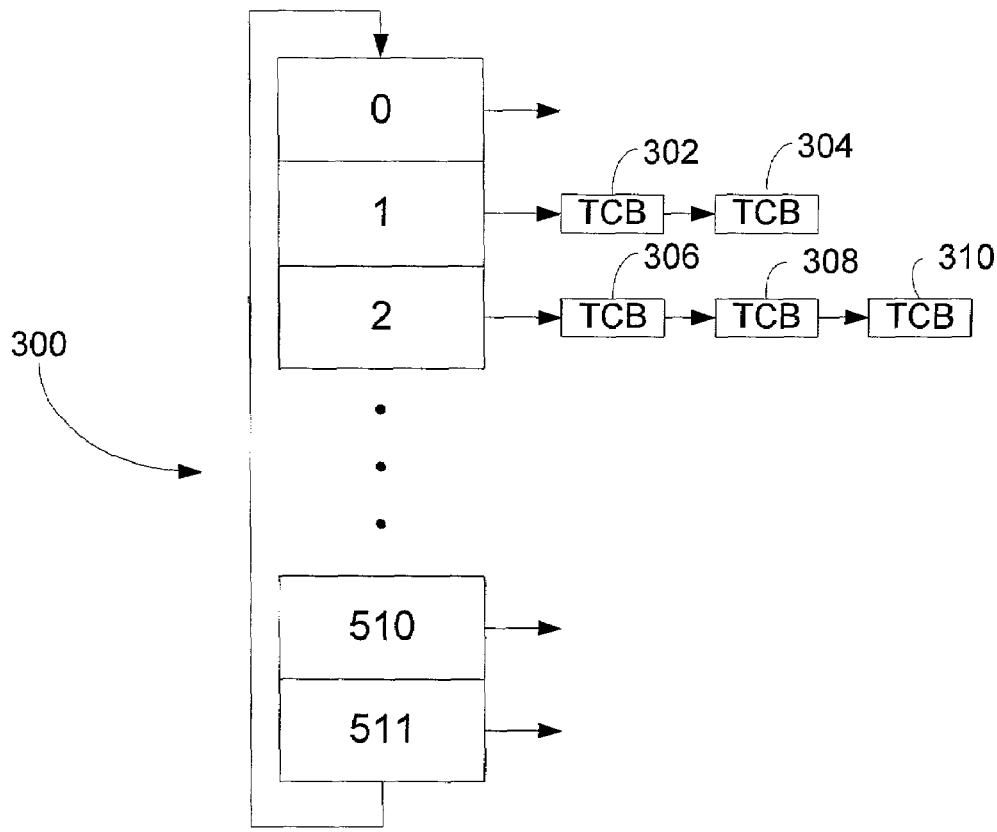
FIG. 3 is a schematic diagram depicting an exemplary memory structure facilitating efficient access to TCP-scheduled action timers for multiple, simultaneously supported connections.

Turning to FIG. 3, an exemplary time-space partitioning structure 300 is schematically depicted. In the illustrative embodiment a circular timer buffer, also referred to as a timer wheel, comprises a set of 512 queues corresponding to 512 distinct time-slices (or ticks). In an embodiment of the invention, each of the 512 queues represents a TCP timer tick—presently 100 milliseconds. Therefore, the timer management framework traverses the set of queues about once every 51 seconds. The traversal period is extended or reduced in alternative embodiments by, for example, modifying the number of queues and/or the time-slice associated with each queue. As will be explained further herein below, the traversal period does not limit the maximum duration between a current time and a time that an action is scheduled to occur in the future.

In an embodiment of the invention, the TCP timer is not limited to values between 0 and 511 ticks. Therefore, selection of a particular partition is determined by applying a modulo 512 operation upon a provided time value. By way of example, queue 0 corresponds to a TCP tick value of 0, 512, 1024, 1536, etc. When a TCP protocol timer tick has a modulo 512 value of "0," partitioned structure 300's queue 0 is accessed by the timer management framework. Time permitting, the management framework accesses all the TCBs within the queue associated with the modulo 512 value generated from a current time tick.

Placing a TCB reference upon a particular queue is determined by performing a modulo 512 operation upon an earliest relevant scheduled action for the connection corresponding to the TCB. Consistent with the above queue access scheme, TCBs 302 and 304 are placed within structure 300's queue 1 that is associated with a modulo 512 value of "1." TCBs 306, 308 and 310 have scheduled events associated with a TCP timer value having a modulo 512 value of "2."

A modulo 512 operation executed upon a scheduled time within a TCB determines the queue within which the TCB is placed. As mentioned previously above, some earliest scheduled actions represented in a TCB occur beyond the full traversal period (e.g., 51.2 seconds). Therefore, not all the TCBs in a currently accessed partition queue include scheduled actions having expired delays. Some may require an additional 51.2 second wait (or a multiple thereof). To ensure that a scheduled action is not processed too early, when a TCB is removed from a partition queue for processing, the timer management framework compares the current TCP tick value to a time for a scheduled action stored within a TCB. If the scheduled action time has not yet been reached, then the TCB is re-queued.

The structure depicted in FIG. 3, and described herein above is merely exemplary. In addition to the above-described variations to the circular buffer of queues, other data structures can be employed. For example, while the partitions are preferably a set of queues, in alternative embodiments the TCBs can be referenced by array entries. Furthermore, the form and content of the TCB queues can take on a variety of forms. For example, in an embodiment of the invention, each queue entry includes a pointer to a TCB stored in a TCB cache. However, in an alternative embodiment the TCB content is stored in the queue entry (rather than merely referencing a TCB).

Furthermore, as will be explained further herein below, TCBs include multiple timers and thus multiple scheduled actions. In a preferred embodiment of the invention, a single queue entry is created for each TCB based upon the earliest of the TCB timers' scheduled actions. Therefore, if scheduled events in a TCB are set to occur at time 1047, 1003, and 2135, then the TCB is referenced by a queue associated with time 1003. However, in alternative embodiments, additional queue entries are created for additional, later scheduled actions on the connection represented by a TCB.

Finally, the present invention contemplates having multiple instances of the timer wheel structure depicted in FIG. 3 for multiprocessor servers. Access to the timer structure is synchronized when inserting or deleting a TCB using a spinlock. Performance can degrade if multiple processors insert and delete TCBs on a same wheel. The multiple instances of the timer wheel structure and distribution of the TCBs relatively evenly among all the timer wheels reduce the instances wherein multiple processors seek access to a same wheel structure at the same time.

Figure 4:
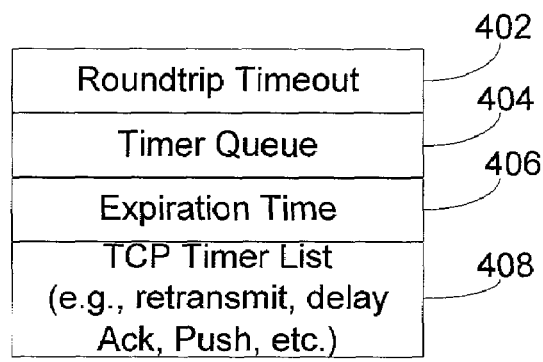
FIG. 4 is a diagram of a partial set of fields within a transmission control block created for each TCP connection.

Turning to FIG. 4, portions of an exemplary TCB structure 400 are schematically depicted. As those skilled in the art will readily appreciate, the TCP transmission control block contains connection state information that is not depicted in FIG. 4. However, such information is not of particular relevance to the implementation of the present invention and therefore is not addressed herein. Furthermore, the TCB structure is merely exemplary and those skilled in the art will readily appreciate the existence of many forms that a TCB can take in view of the broad teachings of the invention disclosed herein.

A roundtrip timeout field 402 stores a value that indicates a delay period before attempting a next retransmission on the current connection. This value is used to schedule a retransmit timer action (stored within a TCP timer list 408 described herein below). A timer queue field 404 stores a value identifying the partition queue ("timer slot") that currently contains a reference to the TCB. The value stored within the timer queue field 404 provides a link back to the TCB enabling the TCB to be moved if necessary when a value within an expiration time field 406 changes. The value in the expiration time field 406 corresponds to the scheduled action, of potentially multiple actions scheduled on a TCB, that is nearest in time to the current TCP timer value. The expiration time value is recalculated each time an earliest scheduled action becomes current.

A TCP timer list 408 stores values corresponding to scheduled action timers supported on the connection. In the exemplary embodiment of the invention such timers include: Retransmission, Delay Acknowledgement, Push, Silly-Window-Syndrome Prevention, Finish-Wait-2-State, and Connection establishment/disconnection timers. Each TCP timer includes its own calculated expiration time. The one that is nearest in time to the current TCP timer value is generally utilized when determining an expiration time—though in some instances described herein below a different value is utilized for the expiration time.

Figure 5:
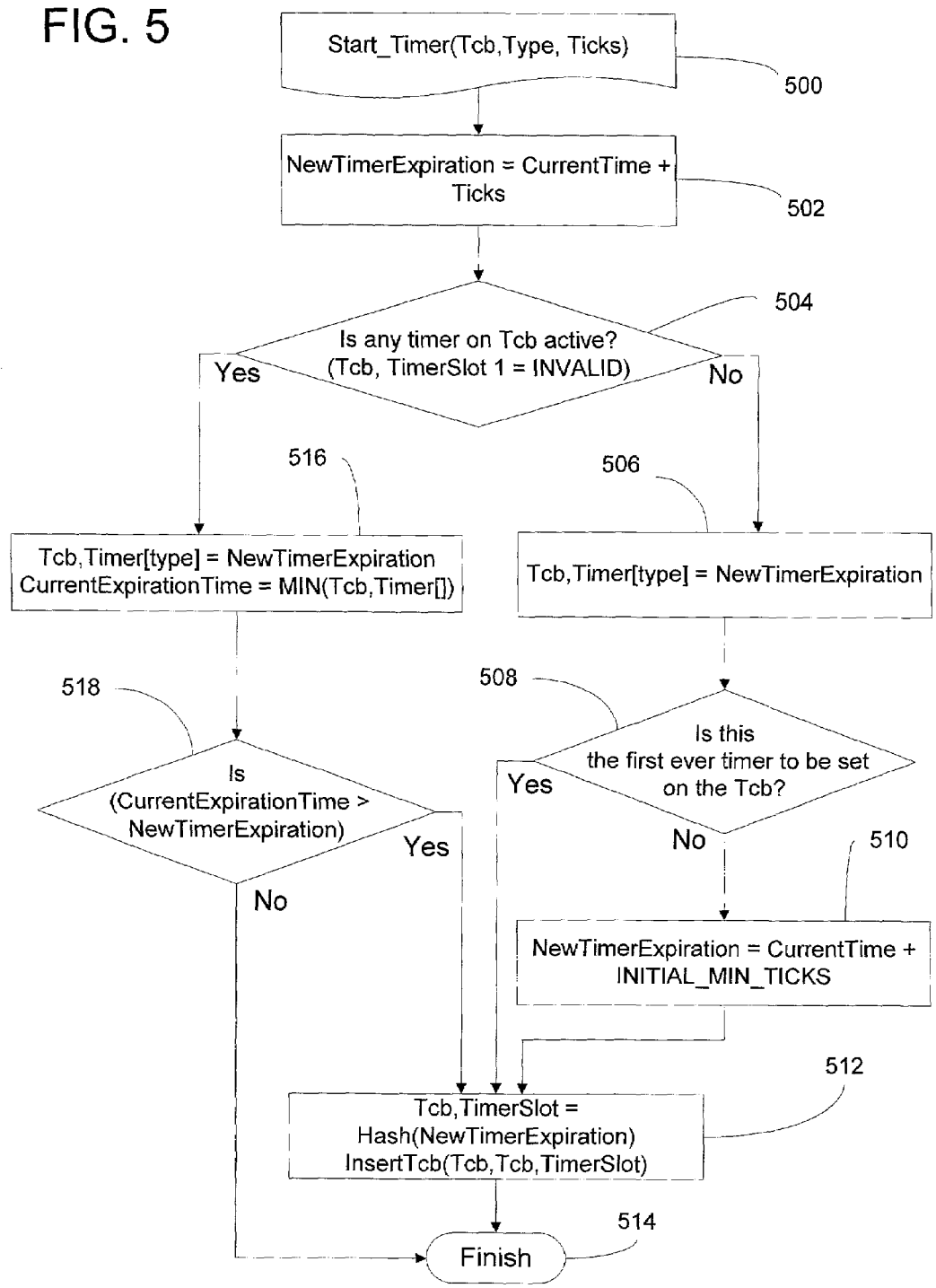
FIG. 5 is a flowchart depicting steps performed when a scheduled action is added to a TCB.

Having described data structures that support an exemplary TCP timer processing scheme embodying the present invention, attention is now directed to FIG. 5 that depicts a set of steps performed whenever a new timer value is added to a TCB. The procedure begins at step 500 during invocation of a start_timer function. The start_timer function call specifies a TCB, a timer type in the TCB, and an expiration time in ticks. The ticks value specifies a number of ticks (1 tick=100 msec.) to add to the current time when calculating a scheduled action time for the identified timer at step 502. Next, at step 504 the TCP timer procedure determines whether the identified TCB is currently on a TCB timer wheel queue. This is determined, for example, by referencing the timer queue field 404 on the TCB. An invalid (e.g., out of range) value indicates that there were previously no scheduled actions on the TCB, and control passes to step 506. At step 506, the timer field corresponding to the specified timer type in the initial start_timer function is loaded with the timer expiration value calculated during step 502. Control then passes to step 508.

At the beginning of a connection, the sending end tends to have a higher frequency of TCB movement. Such movement often occurs because many of the timer parameters are dynamically calculated and stable after multiple roundtrips. Furthermore, a timer often starts out large during an initial connection and settles to a smaller number as a number of transmissions are carried out over the connection. For example, a typical timeout protocol under TCP assumes a large value for the roundtrip delay and then adjusts the estimate as acknowledgements are received on the connection. The retransmission timer, based upon the calculated roundtrip delay (RTO), is repeatedly rescheduled for earlier times. This can require replacing the TCB within an earlier timeslot than its previous timeslot location on the timer wheel. The movement of TCBs on the timer wheel is a costly transaction requiring locking of the resource to ensure synchronization. Steps 508 and 510 represent a refinement, called "early insertion," to an ordinary timer expiration algorithm that seeks to avoid having to move a TCB to an earlier expiring slot on a timer wheel.

To avoid the above-described excessive TCB movement during initial connection transactions, in accordance with an embodiment of the present invention, at step 508 if the timer was the first of any timer of the TCB to be loaded (during step 506), then control passes to step 510. At step 510, the procedure resets the new timer expiration value equal to the current time plus a minimal additional set of ticks. In an embodiment of the present invention the minimum added ticks equals two ticks (or a delay of 200 milliseconds) before the scheduled action will fire. Thereafter, control passes to step 512.

At step 512 the TCB timer computation procedure determines the proper queue (timer slot) within which the TCB is to be placed. This is determined by performing a "modulo 512" hash function upon the value established for the new timer expiration. Thereafter, a queue entry is constructed for the TCB in the appropriate time slot on the 512-slot timer wheel. Control then passes to the Finish 514. If at step 508, a timer on the TCB had previously been scheduled, then control passes directly to step 512.

Having described the case where a TCB was previously inactive (i.e., had no scheduled actions on its timers), attention is now directed to the case where the TCB already had scheduled actions (i.e., it is already referenced by a timer queue on the timer wheel structure). Control passes from step 504 to step 516 wherein the timer field corresponding to the specified timer type in the initial start_timer function is loaded with the new timer expiration value calculated during step 502. Also, during step 516 the current expiration time (stored in expiration time field 406) is loaded with the earliest expiration time of all timers in the TCB. Thereafter, control passes to step 518.

At step 518 the timer-processing procedure determines whether an earlier expiration time has been calculated for the TCB (requiring the TCB reference to be moved to an earlier slot in the timer wheel). If the previous value stored in field 406 (before step 516) was later in time than the new timer expiration value calculated during step 502, then the TCB is moved up within the timer wheel during step 512 based upon the new timer expiration value. If the previous value stored in field 406 was earlier in time than the new timer expiration value calculated during step 502, the TCB is unaffected and control passes to the Finish 514 (i.e., the TCB reference is not moved in the timer wheel).

Figure 6:
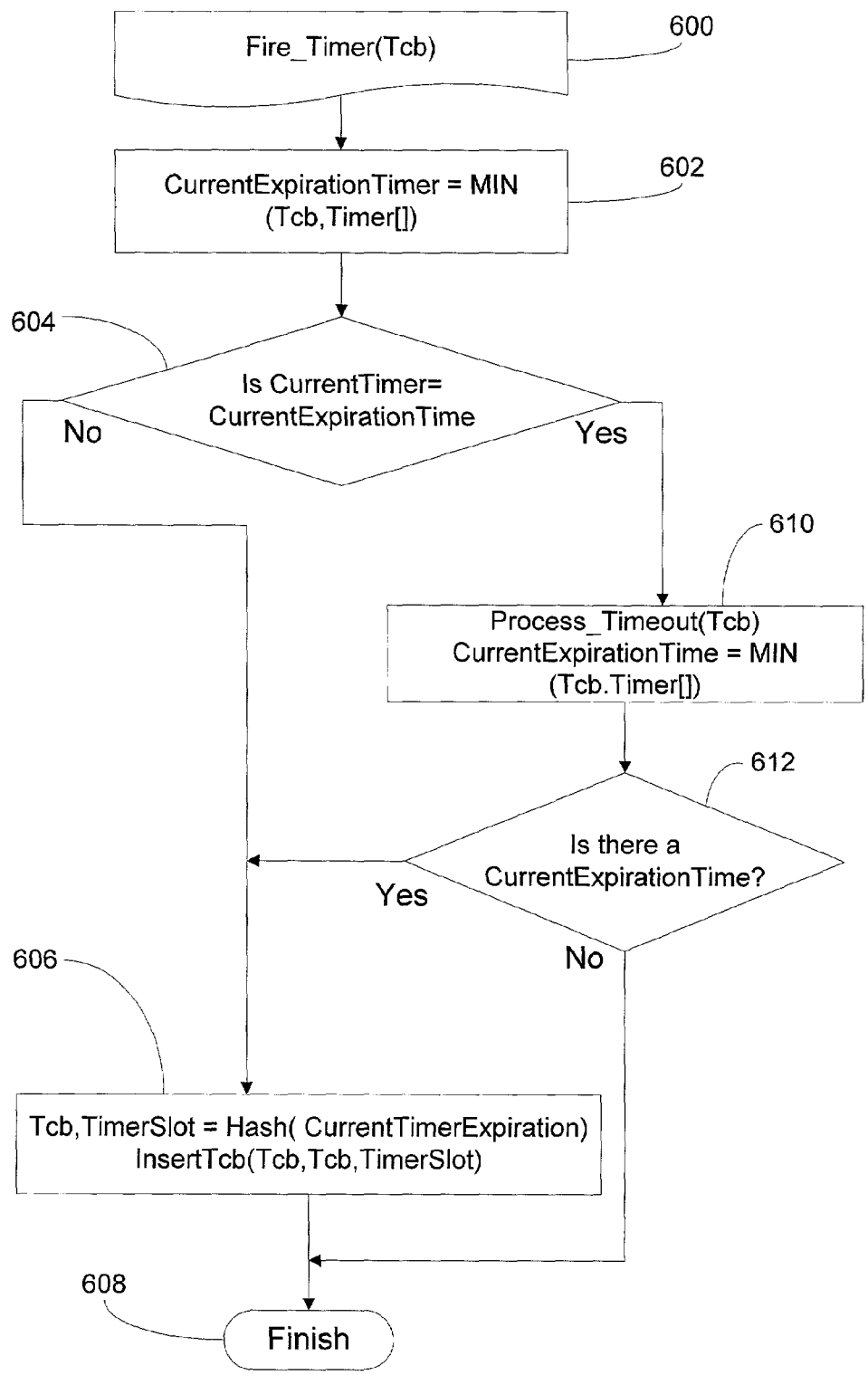
FIG. 6 is a flowchart depicting steps performed when an expiration time is reached for a TCB causing its individual timers to be reviewed for potential scheduled action processing.

Having described an exemplary procedure for updating a TCB when a new action is scheduled on a connection, attention is now directed to FIG. 6 that depicts a set of steps associated with a procedure for handling when an expiration time for a TCB (stored in the expiration time field 406 matches a current protocol timer. This event potentially arises, in the exemplary embodiment of the invention, when a particular one of the queues depicted in FIG. 3 is processed based upon a current tick value of a TCP protocol timer. The steps described herein below are exemplary. As those skilled in the art will readily appreciate, the present invention can be carried out in a variety of manners and the steps described herein below can be rearranged and modified in accordance with alternative embodiments of the present invention. Such alternatives include various mechanisms for partitioning the set of TCBs to reduce the quantity of TCBs observed during any particular review period (e.g., every 100 msec. or a single protocol timer "tick")

During step 600 a procedure call is issued to a Fire_Timer function. The Fire_Timer call is invoked on behalf of each TCB referenced in a timer wheel queue having an expiration value in field 406 equal to the current TCP timer value. The Fire_Timer function call includes a reference to a TCB on the timer wheel structure.

In response, during step 602 a current expiration time value for the TCB is calculated by taking the minimum expiration time of each scheduled timer action in the TCP timer list 408 for the TCB. Thereafter, at step 604 if the current expiration time calculated at step 602 is not equal to the TCP timer current time, then control passes to step 606. At step 606 a new timer wheel slot is calculated for the TCB based upon the current expiration time generated during step 602. A reference to the TCB is added to the queue (timeslot) corresponding to the calculated new timer wheel slot. Control then passes to the Finish 608.

Alternatively, if one of the TCB's timers of the TCP timer list 408 has indeed expired (a scheduled event is now current), then control passes from step 604 to step 610. At step 610 each timer in the TCB that has expired is processed. A new expiration value is calculated based upon the minimum time to expiration of the remaining scheduled actions represented by the timers in the TCB. The new expiration value is stored in field 406 of the TCB. Thereafter, at step 612 if there are still scheduled actions on the TCB (i.e., an expiration value for a scheduled action was re-loaded in field 406 of the TCB at step 610), then control passes to step 606. However, if there are no scheduled actions (i.e., the TCB is inactive), then the TCB is not replaced on the TCP timer wheel.

In some instances the scheduled action on a TCB is cancelled before a corresponding timer fires. In such instances, the corresponding field in the timer list 408 is cleared. If the remaining scheduled timeouts in the TCB are greater than the cleared value, then a new expiration value in fact exists. In an embodiment of the present invention, a new value is indeed calculated and the TCB reference is moved to a new time slot in the timer wheel based upon the new expiration value. However, in a preferred embodiment of the invention, no action is taken other than clearing, or resetting, the appropriate TCP timer list entry. This lazy remove feature avoids potentially unnecessary moves of TCB references on the timer wheel.

Illustrative embodiments of the present invention and certain variations thereof have been provided in the Figures and accompanying written description. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A communications timer management framework for handling network communications protocol action scheduling timers within connection status structures maintained for simultaneous network connections support by a server and wherein each connection status structure supports a plurality of timers associated with a connection, the framework comprising:
   an active connections timer structure comprising a set of references associating the active connection timer structure with ones of the set of connection status structures;
   a scheduled action handler that:
   receives notification of an action scheduled on a connection, and
   adds, in the active connections timer structure, a reference associating the active connections timer structure with a connection status structure corresponding to the connection and supporting a plurality of timers associated with the connection in response to determining that the connection status structure is not currently referenced on the active connections timer structure.

2. The communications timer management framework of claim 1 wherein the active connections timer structure comprises a set of time-space partitioned sub-structures associated with particular time states of a communication protocol timer, and wherein the stub-structures include the references associating the active connection timer structure with ones of the set of connection status structures.

3. The communications timer management framework of claim 2 wherein the connection status structures include an expiration time value, and wherein references associating the active connection timer structure with ones of the connection status structures are placed on particular ones of the set of timespace partitioned sub-structures according to an expiration time value for each connection status structure.

4. The communications timer management framework of claim 3 wherein the scheduled action handler assigns an expiration time corresponding to a minimum initial delay to a connection status structure that is not currently referenced on the active connections timer structure.

5. The communications timer management framework of claim 4 wherein the scheduled action handler determines whether the connection status structure has ever been referenced on the active connections timer structure.

6. The communications timer management framework of claim 3 wherein a reference associating the active connection timer structure with a connection status structure remains in its assigned time-space partitioned sub-structure unless one of two events occurs:
   an earlier expiration time is assigned to the connection status structure, or
   the expiration time equals the current time of the communication protocol timer.

7. The communications timer management framework of claim 2 wherein the communication protocol timer comprises a periodic timer.

8. The communications timer management framework of claim 7 wherein the difference in time between temporally adjacent time-space partitioned substructures corresponds to a repetition period for a scheduled action check sequence.

9. The communications timer management framework of claim 8 wherein the repetition period for a scheduled action check sequence equals a single period timer tick.

10. The communications timer management framework of claim 2 wherein the active connections timer structure comprises a circular buffer of queues; and wherein the queues support storing references associating the active connection timer structure with connection status structures.

11. A method for handling network communications protocol action scheduling timers within connection status structures maintained for simultaneous network connections supported by a server, wherein each connection status structure supports a plurality of timers associated with a connection and the server includes an active connections timer structure comprising a set of references associating the active connection timer structure with ones of the set of connection status structures, the method comprising the steps of:
   receiving notification of an action scheduled on a connection; and
   adding, in the active connections timer structure, a reference associating the active connection timer structure with a connection status structure supporting a plurality of timers corresponding to the connection in response to determining that the connection status structure is not currently referenced on the active connections timer structure.

12. The method of claim 11 wherein the active connections timer structure comprises a set of time-space partitioned sub-structures associated with particular time states of a communication protocol timer, and wherein the adding step comprises storing a reference associating the active connection timer structure with the connection status structure within a one of the time-space partitioned sub-structures.

13. The method of claim 12 wherein the connection status structures include an associated expiration time, and wherein storing a reference during the adding step comprises determining the one of the time-space partitioned sub-structures to store the reference associating the active connection timer structure with the connection status structure according to an expiration time value assigned to the connection status structure.

14. The method of claim 13 further comprising:
    determining that the connection status structure is not currently referenced on the active connections timer structure; and
    assigning, by a scheduled action handler, an expiration time value corresponding to a minimum initial delay to the connection status structure.

15. The method of claim 14 wherein the determining step particularly comprises determining whether the connection status structure has ever been referenced on the active connections timer structure.

16. The method of claim 13 wherein the reference associating the active connection timer structure with the connection status structure remains in the assigned time-space partitioned sub-structure unless one of two events occurs:
    an earlier expiration time is assigned to the connection status structure, or
    the expiration time equals the current time of the communication protocol timer.

17. The method of claim 13 further comprising the step of determining that a new expiration time for the connection status structure is later than the previous expiration time value assigned to the connection status structure, and maintaining the reference associating the active connection timer structure with the connection status structure in the same time-space partitioned sub-structure.

18. The method of claim 12 wherein the communication protocol timer comprises a periodic timer.

19. The method of claim 18 wherein the difference in time between adjacent time-space partitioned substructures corresponds to a repetition period for a scheduled action check sequence.

20. The method of claim 19 wherein the repetition period for a scheduled action check sequence equals a single periodic timer tick.

21. The method of claim 20 wherein the active connections timer structure comprises a circular buffer of queues; and wherein the queues support storing references associating the active connection timer structure with connection status structures.

22. A computer-readable medium having computer-executable instructions for facilitating handling network communications protocol action scheduling timers within connection status structures maintained for simultaneous network connections supported by a server, wherein each connection status structure supports a plurality of timers associated with a connection and the server includes an active connections timer structure comprising a set of references associating the active connection timer structure with ones of the set of connection status structures, the computer-readable medium having computer-executable instructions facilitating performing the steps of:
    receiving notification of an action scheduled on a connection; and
    adding, in the active connections timer structure, a reference associating the active connection timer structure with a connection status structure supporting a plurality of timers corresponding to the connection in response to determining that the connection status structure is not currently referenced on the active connections timer structure.

23. The computer-readable medium of claim 22 wherein the active connections timer structure comprises a set of time-space partitioned sub-structures associated with particular time states of a communication protocol timer, and wherein the adding step comprises storing a reference associating the active connection timer structure with the connection status structure within a one of the time-space partitioned sub-structures.

24. The computer-readable medium of claim 23 wherein the connection status structures include an associated expiration time, and wherein storing a reference during the adding step comprises determining the one of the time-space partitioned sub-structures to store the reference associating the active connection timer structure with the connection status structure according to an expiration time value assigned to the connection status structure.

25. The computer-readable medium of claim 24, further including computer-executable instructions facilitating performing the steps of:
    determining that the connection status structure is not currently reference on the active connections timer structure; and
    assigning, by a scheduled action handler, an expiration time value corresponding to a minimum initial delay to the connection status structure.

26. The computer-readable medium of claim 25 wherein the determining step particularly comprises determining whether the connection status structure has ever been referenced on the active connections timer structure.

27. The computer-readable medium of claim 24 wherein the computer-executable instructions maintain the reference associating the active connection timer structure with the connection status structure in the assigned time-space partitioned sub-structure unless one of two events occurs:
    an earlier expiration time is assigned to the connection status structure, or
    an expiration time equals the current time of the communication protocol timer.

28. The computer-readable medium of claim 24 further comprising computer-executable instructions facilitating determining that a new expiration time for the connection status structure is later than the previous expiration time value assigned to the connection status structure, and maintaining the reference associating the active connection timer structure with the connection status structure in the same time-space partitioned sub-structure.

29. The computer-readable medium of claim 23 wherein the communication protocol timer comprises a periodic timer.

30. The computer-readable medium of claim 29 wherein the difference in time between adjacent time-space partitioned substructures corresponds to a repetition period for a scheduled action check sequence.

31. The computer-readable medium of claim 30 wherein the repetition period for a scheduled action check sequence equals a single periodic timer tick.

32. The computer-readable medium of claim 31 wherein the active connections timer structure comprises a circular buffer of queues; and wherein the queues support strong references associating the active connection timer structure with connection status structures.

33. A computer program embodied on a computer-readable medium and comprising computer-executable instructions configured to use a circular data structure to manage a plurality of timers associated with a plurality of network connections, wherein the instructions are executable to:
    receive notification of an action scheduled on one of the network connections;
    determine whether an entry corresponding to the action is present on the circular data structure; and
    update, if no corresponding entry is present, an entry in the circular data structure to reference a connection structure associated with a new action, and wherein the connection structure supports multiple timers including a timer corresponding to the action.

* * * * *